(12) United States Patent
Yahia et al.

(10) Patent No.: US 9,021,820 B2
(45) Date of Patent: May 5, 2015

(54) OPTIMIZATION OF AN OVERALL HEATING CAPACITY OF AN AIR CONDITIONING SYSTEM

(75) Inventors: Mohamed Yahia, Paris (FR); Bertrand Nicolas, Elancourt (FR); Samy Hammi, Paris (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 1176 days.

(21) Appl. No.: 12/968,368

(22) Filed: Dec. 15, 2010

(65) Prior Publication Data

US 2011/0146305 A1 Jun. 23, 2011

(30) Foreign Application Priority Data

Dec. 17, 2009 (FR) .................................. 09 06128

(51) Int. Cl.
*F25B 7/00* (2006.01)
*F25B 13/00* (2006.01)
*F25B 27/00* (2006.01)
*F25B 29/00* (2006.01)
*B60H 1/32* (2006.01)
*B60H 3/00* (2006.01)
(Continued)

(52) U.S. Cl.
CPC .. *B60H 1/00921* (2013.01); *B60H 2001/00928* (2013.01); *B60H 2001/00949* (2013.01)

(58) Field of Classification Search
USPC ............... 62/79, 160, 244, 323.3; 165/42, 43, 165/202, 241; 700/276
See application file for complete search history.

(56) References Cited

U.S. PATENT DOCUMENTS 5,501,267 A * 3/1996 Iritani et al. .................. 165/202
5,537,831 A 7/1996 Isaji et al.
(Continued)

FOREIGN PATENT DOCUMENTS

DE 10241717 A1 3/2003
JP 11235919 8/1999

OTHER PUBLICATIONS

English language abstract and equivalent for DE 10241717 extracted from the espacenet.com database on Jul. 6, 2011, 25 pages.
(Continued)

*Primary Examiner* — Alexandra Elve
*Assistant Examiner* — Larry Furdge
(74) *Attorney, Agent, or Firm* — Howard & Howard Attorneys PLLC

(57) ABSTRACT

The invention relates to a control process for an air conditioning system. The air conditioning system comprises a thermal loop (1) used as a heat pump and an electrical heating device (2). The process calculates a global heating capacity (HCglo) in function of the temperature chosen by the passenger, the speed of the blower and the temperature of the exterior air. Then, the process calculates a heating capacity (HC1) of the thermal loop (1) and compares this heating capacity (HC1) of the thermal loop to the global heating capacity (HCglo). If the global heating capacity (HCglo) is superior to the heating capacity (HC1) of the thermal loop, the process determines a heating capacity (HC2) of the electrical heating device (2). This heating capacity (HC2) of the electrical heating device (2) added to the heating capacity (HC1) of the thermal loop (1) allows to obtain the global heating capacity (HCglo) required in function of the temperature selected by the passenger.

8 Claims, 3 Drawing Sheets

(51) Int. Cl.
 *B60H 1/00* (2006.01)
 *G05D 23/00* (2006.01)

(56) References Cited

U.S. PATENT DOCUMENTS 6,118,099 A 9/2000 Lake et al.

2003/0046946 A1 3/2003 Nagai et al.

OTHER PUBLICATIONS

English language abstract and translation for JP 11235919 extracted from the PAJ database on Jul. 6, 2011, 32 pages.
INPI Institut National De La Propriete Industrielle Search Report for Application No. FA729953/FR0906128 dated Apr. 30, 2010, 1 page.

* cited by examiner

OPTIMIZATION OF AN OVERALL HEATING CAPACITY OF AN AIR CONDITIONING SYSTEM

RELATED APPLICATIONS

This application claims priority to and all the advantages of French Patent Application No. FR 09/06128, filed on Dec. 17, 2009.

This invention relates to the general field of processes for control of air conditioning systems for motor vehicles. More specifically, the invention relates to a process for control of an air conditioning system including a heat loop operating according to a so-called "heat pump" mode, including at least one external heat exchanger, an internal heat exchanger or a water-air exchanger radiator, a compressor and an evaporator, in which the heat loop provides a heating capacity for the heat loop, and, complementarily, the air conditioning system includes an electrical heating device providing a complementary heating capacity for the electrical device. The air conditioning systems concerned by the invention also comprise a control device in which the process according to the invention is implemented.

In such air conditioning systems, generally implemented in hybrid or electric vehicles, the total heating capacity can be provided by a heat loop operating in a heat pump accompanied by one or more complementary electrical heating devices.

The invention relates more specifically to the strategies making it possible to determine the percentage of use of the complementary electrical device(s) and the heat loop operating in heat pump mode so as to obtain an optimal coefficient of performance for the air conditioning system.

It is known that the electrical heating devices have a coefficient of performance equal to 1 while the heat loops operating in heat pump mode have a coefficient of performance generally greater than 1, but decreasing significantly as the temperature of the external environment into which the heat is pumped decreases.

In the air conditioning systems covered by the invention, the electrical heating device is intended to support the heat loop operating in heat pump mode, in particular when the coefficient of performance of the heat loop falls due to excessively low external temperatures.

SUBJECT MATTER AND SUMMARY OF THE INVENTION

This invention is therefore intended to enable the use of a complementary electrical heating device in an air conditioning system to be optimized by proposing that the control process according to the invention include the following steps:
  receipt of a set point temperature,
  determination of the air speed at the level of the external heat exchanger,
  determination of the temperature of an air flow inside the air conditioning system,
  determination of the air flow rate over the internal heat exchanger or the water-air exchanger radiator,
  calculation of an overall heating capacity on the basis of the temperature set point, the temperature of the air flow and the air flow rate over the internal heat exchanger,
  determination of a heating capacity of the heat loop,
  comparison of the heating capacity of the heat loop with the overall heating capacity,
  adjustment of the heating capacity of the complementary electrical device, as the case may be, as a complement to the heating capacity of the heat loop if the heating capacity of the heat loop is lower than the overall heating capacity.

The invention thus makes it possible to determine the value of the heating capacity of the heat loop enabling the optimal coefficient of performance to be obtained, as a function of the overall heating capacity required by the air conditioning system.

Advantageously, the process includes a step of limiting the heating capacity of the heat loop to the heating capacity of the heat loop cancelling the derivative with respect to this heating capacity of the heat loop of the overall coefficient of performance if this derivative is cancelled for a heating capacity of the heat loop below the overall capacity calculated.

According to an advantageous embodiment of the invention, the process includes a preliminary step of estimating two coefficients a and b of a linear approximation of the coefficient of performance of the heat loop as a function of the heating capacity of the heat loop, in which these coefficients are each estimated as a function of the components of the heat loop, for at least a plurality of air speeds in the external heat exchanger, a plurality of temperatures of the air flow and a plurality of mass air flow rates in the internal heat exchanger, in which the process then includes, after the measurement steps, a step of determining, among the coefficients estimated, coefficients of the approximation of the coefficient of performance of the heat loop corresponding to the parameters measured, in which the heating capacity of the thermal system is limited to $(b^{1/2}-b)/a$.

Such an embodiment is particularly simple to implement once it is possible to store the coefficients a and b for the plurality of parameters capable of varying during operation of the heat loop.

According to a specific feature of the invention, the air conditioning system including an air-water heat loop and having a complementary electrical water heating device, coefficients a and b are also estimated as a function of the overall required heating capacity.

This feature takes into account particularities of the operation of a complementary electrical water heating device.

In applications, the invention is capable of relating to air conditioning systems chosen from air conditioning systems including an air-air heat loop and equipped with an electrical air heating device, air conditioning systems including an air-water heat loop and equipped with an electrical air heating device, and air conditioning systems including an air-water heat loop and equipped with an electrical water heating device with or without an electrical air heating device.

All of these types of heat pump apparatuses can be covered by the invention insofar as it is possible to use a complementary electrical heating device having a coefficient of performance equal to 1 as a complement to the operation of the thermal system.

According to a preferred implementation, the different steps of the process according to the invention are determined by computer program instructions.

Consequently, the invention also relates to a computer program on a data medium, which program is capable of being implemented in a computer, and which program comprises instructions suitable for implementing the steps of the process according to the invention.

The program can use any programming language, and be in the form of a source code, object code or intermediate code between the source code and object code, such as in a partially compiled form, or in any other desirable form.

The invention also relates to a computer-readable data medium comprising computer program instructions as mentioned above.

The data medium can be any entity or device capable of storing the program. For example, the medium can comprise storage means, such as a ROM, for example a CD-ROM or a microelectronic circuit ROM, or magnetic recording means, for example a floppy disk, a hard disk, a flash memory, a USB key, and so on.

In addition, the data medium can be a transmissible medium such as an electrical or optical signal, which can be routed via an electrical or optical cable, by radio or by other means. The program according to the invention can in particular be downloaded to an Internet-type network.

Alternatively, the data medium can be an integrated circuit in which the program is incorporated, and the circuit is suitable for being operated or for being used in the operation of the process in question.

BRIEF DESCRIPTION OF THE DRAWINGS

Other features and advantages of this invention will become clear from the following description, in reference to the appended drawings that illustrate a non-limiting example embodiment. In the figures:

FIG. 1 diagrammatically shows a first type of air conditioning system in which the process, according to the invention, can be implemented.

Figure 1:
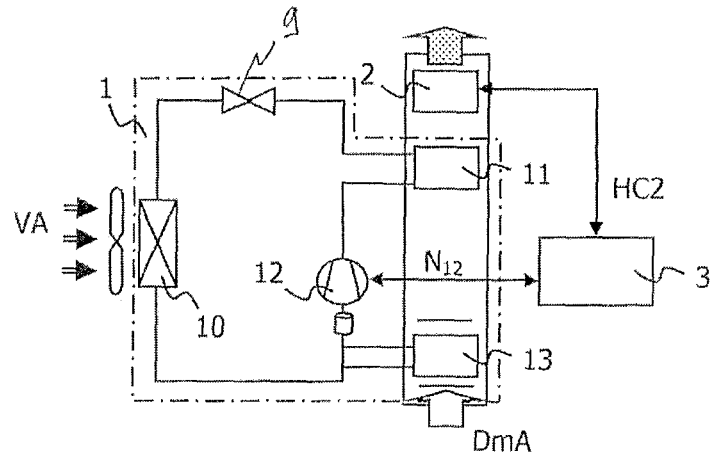
FIG. 1 diagrammatically shows the structure of an air-air air conditioning system in which the invention is capable of being implemented.

The air conditioning system includes a heat loop 1 including at least one external heat exchanger 10, an internal heat exchanger 11, a compressor 12, an expansion device 9 and an evaporator 13. The heat loop is of the air-air type. By "air-air", we mean that the heat produced by the heat loop 1 is delivered directly to an air flow passing through the air conditioning system. The heat loop operates according to a so-called "heat pump" mode. By "heat pump", we mean that the heat loop produces calories intended to heat the air flow passing through the air conditioning system. The internal heat exchanger 11 operates in this heat pump mode like a condenser.

The air conditioning system also includes a complementary electrical heating device 2 intended to heat the air flow passing through the air conditioning system. The air conditioning system finally includes a control device 3 in which the process according to the invention is implemented.

During operation of the air conditioning system, the air arrives at the external temperature at the level of the external heat exchanger 10 with a speed VA, and this circulation is optionally at least partially generated by a fan. The speed of the air VA on the external heat exchanger 10 is dependent on the speed of the vehicle and the voltage applied to the fan.

At the same time, a mass air flow DmA of the air flow circulates in succession through the evaporator 13, the internal heat exchanger 11 and the complementary electrical heating device 2. This circulation gives effect to the ventilation, air condition and heating of the air conditioning system. The air flow entering the air conditioning system is at a temperature Tfa. When the air conditioning system operates in air recycling mode, the temperature Tfa is that of the recycled air flow Trecy. When the air conditioning system operates in outside air mode, the temperature Tfa is that of the outside air Text.

At the outlet of this circulation, i.e. the outlet of the air conditioning system, the air flow is then at a temperature above that observed at the inlet of the circulation at the level of the evaporator.

The control device 3 makes it possible to control the heating capacity of the heat loop 1, by sending speed set points of the compressor $N_{12}$ to same.

The control device 3 also makes it possible, according to the invention, to control the operation of the complementary electrical heating device 2 by sending a control signal $HC_2$ of the heating capacity to be generated by said complementary device 2.

Figure 2:
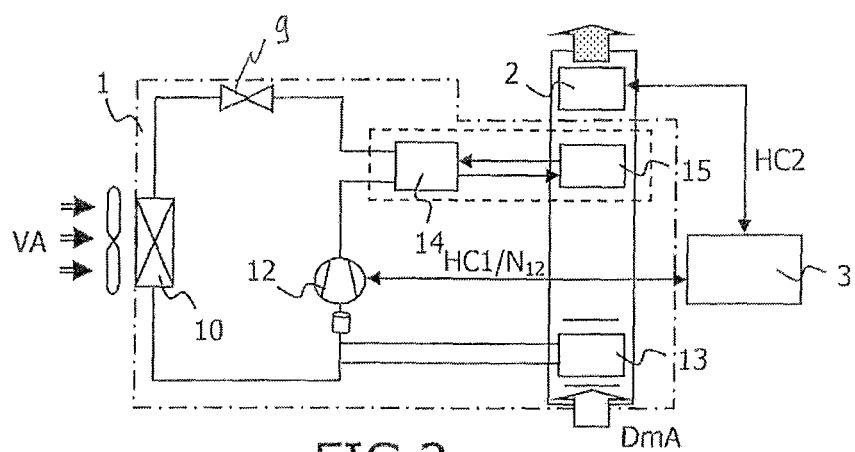
FIG. 2 shows the structure of an air-water air conditioning system in which the invention is capable of being implemented.

FIG. 2 diagrammatically shows an air conditioning system including, instead of the internal heat exchanger 11, a water circuit, surrounded by bars, classically comprised of a water condenser 14 and an air-water exchanger radiator 15. The heat loop 1 is then of the air-water type. By "air-water", we mean that the calories produced by the heat loop 1 are transferred to the air flow passing through the air conditioning system via the water circuit including the water condenser 14 and the air-water exchanger radiator 15.

During operation of this air conditioning system, the air flow is transported with a mass flow rate DmA and passes through the evaporator 13, the air-water exchanger radiator 15 and the complementary heating device 2.

Again, the control device 3 is capable of controlling the operation of the compressor 12 as well as the operation of the complementary electrical air heating device 2, similarly to that of the air conditioning system shown in FIG. 1.

Figure 3:
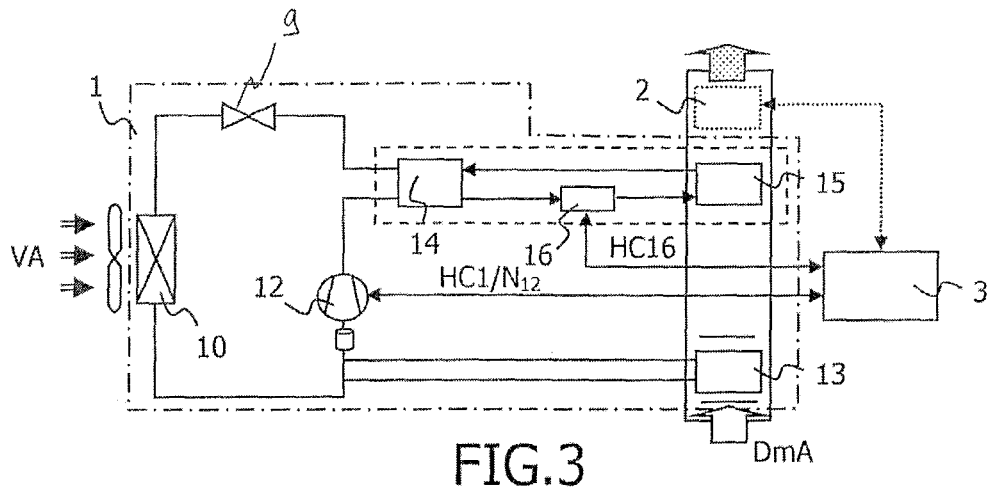
FIG. 3 diagrammatically shows the structure of an air-water air conditioning system in which the invention is capable of being implemented.

FIG. 3 shows an air-water air conditioning system having a complementary electrical heating device 16, capable of heating the water in the water circuit. The electrical water heating device 16 is thus generally inserted between the water condenser 14 and the air-water exchanger radiator 15.

The control device 3 is then capable of controlling the operation of the compressor 12 and also of controlling the heating capacity HC16 of the complementary water heating device 16.

Figure 4:
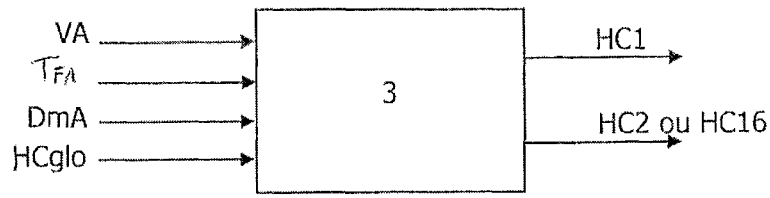
FIG. 4 shows a block diagram of a device for controlling the operation of the air conditioning system according to the invention.

FIG. 4 diagrammatically shows a block diagram of the control device 3 in which the device according to the invention is implemented. According to the invention, this control device 3 receives operating parameters for the air conditioning system: in particular, for implementation of the invention, a set point temperature Tcons provided by the user, the temperature of the air flow Tfa, the mass air flow rate DmA passing through the evaporator 13, the internal heat exchanger 11, or, in the case of an air-water heat loop, the water-air exchanger radiator 15, and the complementary electrical heating device 2. The control device also receives the air speed at the level of the external heat exchanger VA.

Finally, the control device 3 must also receive an overall heating capacity HCglo necessary for obtaining a set point temperature T cons provided by the user.

The overall heating capacity HCglo is generally determined by calculation on the basis of a set point temperature value Tcons provided by the user.

According to the invention, on the basis of the determination of the operating parameters of the heat loop and the set point temperature value Tcons, the control device 3 is capable of calculating a distribution of the heating capacity between the heat loop 1 and the complementary electrical heating device 2.

Thus, at the output of the control device 3, two control signals are available for adjusting the heating capacity of the heat loop HC1 and the heating capacity of the complementary electrical heating device HC2.

For this, the control device 3 uses the dependency of the overall coefficient of performance of the air conditioning system, denoted COPglo as a function of the heating capacity of the heat loop HC1.

As is well known, for the same process conditions, the change in the coefficient of performance of a heat loop operating in heat pump mode decreases proportionally to the heating capacity provided by this heat loop.

The process implemented in the control device 3 makes it possible to determine the proportion of use of the heat loop and of the complementary electrical heating device in order to obtain the optimal overall coefficient of performance.

In addition, if a complementary electrical air heating device 2 is used, the overall coefficient of performance is expressed as follows:

$$COPglo = \frac{HCglo}{P12 + P2}$$

In this expression, $P_{12}$ is the electrical consumption of the compressor, and $P_2$ is the electrical consumption of the complementary electrical heating device. If an electrical water heating device 16 is used, a consumption P16 is then present in the denominator instead of P2.

According to the coefficient of performances of the heat loop COP1 and the electrical device, it is then possible to express the electrical consumptions of the compressor 12 and the complementary electrical heating device 2, and the following expression is thus obtained:

$$COPglo = \frac{COP1 \cdot COP2}{\frac{HC1}{HCglo}COP2 + \frac{HC2}{HCglo}COP1}$$

in which HC1 and HC2 are heating capacities offered by the heat loop 1 and the complementary electrical heating device 2.

The coefficient of performance of the electrical devices COP2 or, as the case may be COP16, generally unitary, will be considered to be equal to 1 below. The coefficient of performance of the heat loop COP1 is classically a function of the heating capacity HC1 of the thermal system 1.

According to the invention, this expression of the overall coefficient of performance COPglo is then derived so as to determine for which value of the heating capacity of the heat loop HC1 this derivative is cancelled.

The following expression is therefore the derivative of the overall coefficient of performance with respect to the heating capacity of the heat loop HC1.

$$(COPglo)' = \frac{COP1^2 \cdot HCglo + HC1 \cdot HCglo \cdot COP1' - COP1 \cdot HCglo}{\left(\frac{HC1}{HCglo} + \frac{HC2}{HCglo}COP1\right)^2}$$

The cancellation of this derivative therefore corresponds to the solution to the following equation:

$$COP1^2.HCglo + HC1.HCglo.COP1' - COP1.HCglo = 0$$

which also solves the equation:

$$\left(\frac{HC1}{COP1}\right)' = 1$$

The solution to this equation then gives a value of HC1 making it possible to obtain optimal operation of the air conditioning system with an optimal distribution of the heating capacity between the heat loop 1 and the complementary heating device 2.

In an advantageous embodiment of the invention described below, a linear approximation of the coefficient of performance of the heat loop COP1 is used.

In the case of an air conditioning system using a complementary electrical heating device for heating the air 2, the coefficient of performance of the heat loop COP1 is solely a function of the heating capacity of the heat loop HC1:

$$COP1 = f(HC1)$$

In the case of an air conditioning system using a complementary electrical water heating device 16, the coefficient of performance of the heat loop COP1 is both a function of the heating capacity of the heat loop HC1 and the overall required heating capacity HCglo.

$$COP1 = f(HC1; HCglo)$$

Indeed, the overall heating capacity HCglo has an effect on the water temperature at the inlet of the water condenser 14 since this value of the overall heating capacity HCglo defines the temperature level of the water at the inlet of the water condenser 14 and at the outlet of the complementary electrical heating device 16.

In spite of these differences, it is possible for the two types of complementary electrical heating device to approximate the coefficient of performance of the heat loop COP1 according to the following equation in which the two coefficients a and b define the change in the coefficient of performance COP1.

$$COP1 = a.HC1 + b$$

These coefficients are stored in a database accessible to the control device 3. These coefficients a and b are determined according to the components of the heat loop implemented. They are also determined and stored for a plurality of air speeds VA, temperatures Tfa and mass flow rates DmA of the air flow when a complementary electrical air device is used.

In the case of an air conditioning system using a complementary electrical water heating device 16, the coefficients a and b are also dependent on the overall heating capacity HCglo of the air conditioning system.

The coefficients a and b are therefore determined and stored for a plurality of values capable of being determined of the process conditions of the air conditioning system.

In addition, the control device 3 advantageously includes storage means, for example in the form of a data table, for storing the coefficients a and b as a function of at least 3 or 4 parameters relating to the process conditions of the air conditioning system. This makes it possible to very quickly provide the values of coefficients and b to the control device 3.

The equation above thus has the following form:

$$\left(\frac{HC1}{a \cdot HC1 + b}\right)' = 1$$

This equation is solved for the following value of the heating capacity of the heat loop:

$$HC1 = \frac{\sqrt{b} - b}{a}$$

Thus, this value of the heating capacity HC1 of the heat loop 1 is the maximum heating capacity for which the heat loop 1 enables the maximum overall coefficient of performance COPglo to be produced.

The heating capacity of the complementary electrical heating device HC2 is then calculated by the control device 3 according to the following equation:

HC2=HCglo−HC1

Figure 5:
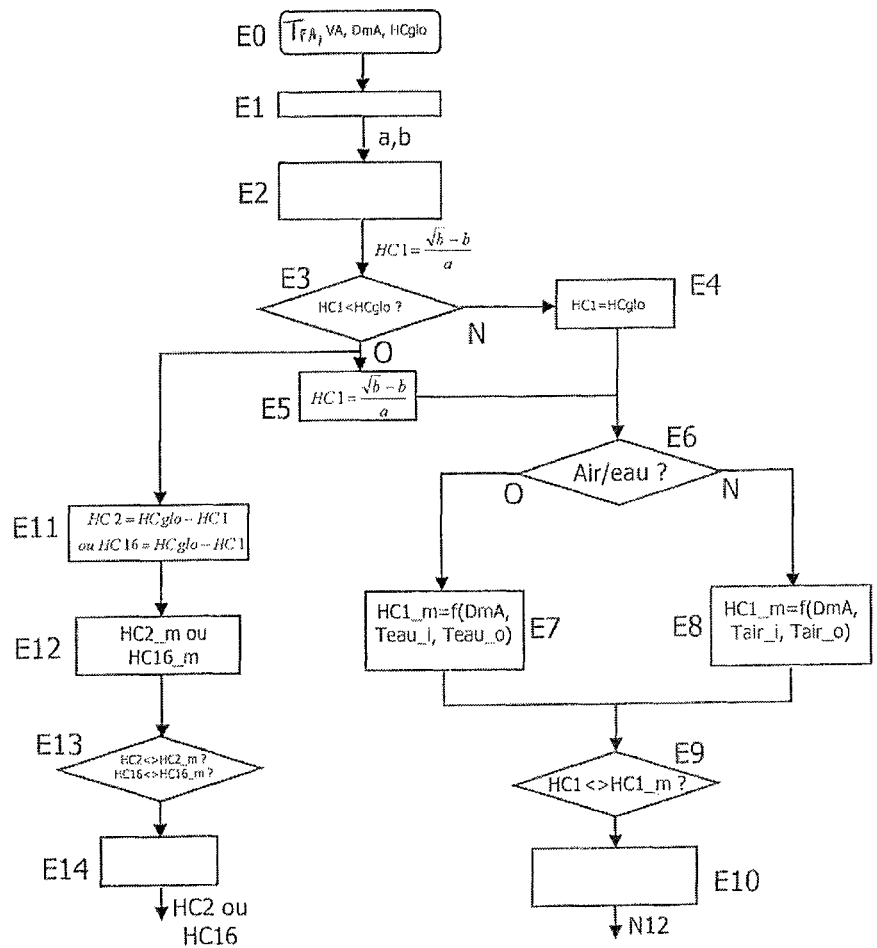
FIG. 5 is a flowchart showing the process according to the invention.

FIG. 5 is a flow chart showing the flow of the process according to the invention.

In a step E0, the process receives information on the temperature Tfa, the air speed VA at the level of the external heat exchanger 10 and the mass air flow rate DmA of the air flow in the air conditioning system. It also receives information on the overall heating capacity HCglo, generally calculated on the basis of a set point temperature Tcons provided by the user.

According to the invention, the coefficient of performance of the heat loop COP1 is expressed in the form of a linear approximation. The process then determines, in a step E1, two coefficients a and b making it possible to express the coefficient of performance of the heat loop COP1 as a function of the heating capacity of the heat loop HC1 in a linear manner.

The values of a and b are determined by reading in a database completed as a function of the operating parameters of the air conditioning system, and, in the case of an air-water air conditioning system, using a complementary electrical water heating device, as a function of the overall required heating capacity.

In a step E2, the optimal value of the heating capacity of the heat loop HC1 is then calculated.

In step E3, the process verifies whether the optimal heating capacity of the heat loop HC1 is below the overall heating capacity corresponding to the set point of the user.

In case (N), in which the heating capacity of the heat loop HC1 making it possible to cancel the derivative of the overall coefficient of performance COPglo as a function of the heating capacity of the heat loop HC1 is not below the overall heating capacity HCglo, then, in a step E4, the heating capacity of the heat loop HC1 entirely fills the overall heating capacity requirements HCglo as required by the user.

In case (O), in which the heating capacity of the heat loop HC1 making it possible to cancel the derivative of the overall performance coefficient COPglo is below the overall required heating capacity HCglo, the value of the heating capacity of the heat loop HC1 is set in a step E5 at the optimal heating capacity value determined in step E2.

The adjustment of the operation of the air conditioning system is then dependent on the type of heat loop used, namely an air-water heat loop or an air-air heat loop. This question is diagrammatically shown in FIG. 5 by step E6. If the heat loop operates in air-water mode, then a calculation of a heating capacity value of the heat loop HC1_m is calculated as a function of the mass flow rate of the air flow DmA, the water temperature Teau_i at the inlet of the water condenser 14 and the water temperature Teau_o at the outlet of the water condenser 14 in a step E7.

If it is an air-air heat loop, a heating capacity value of the heat loop HC1_m is also calculated, this time as a function of the mass flow rate of the air flow DmA, the temperature of the air flow Tair_i at the inlet of the internal heat exchanger 11 and the temperature of the air flow Tair_o at the outlet of the heat exchanger, which is internal 11 in a step E8.

In both cases, the process includes a step of comparing the calculated value of the heating capacity of the heat loop CH1_m with the heating capacity control value of the heat loop HC1.

A step E10 then calculates a compressor speed control value N12, which is then sent to the compressor 12.

If the heating capacity of the heat loop HC1 is below the overall required heating capacity HCglo, in parallel with the operation of the heat loop 1 and the adjustment of the heating capacity HC1, a calculation of the set point heating capacity is also performed for the complementary electrical heating device HC2 or HC16.

This is shown in FIG. 5 by the following steps in which, in succession, in step E11, the set point value of the heating capacity of the complementary electrical device HC2 or HC16 is calculated as a function of the heating capacity of the heat loop HC1 and the overall required heating capacity HCglo.

HC2 or HC16=HCglo−HC1

In step E12, a real value of the heating capacity of the complementary electrical heating device HC2_m or HC16_m is calculated as a function of the determined parameters of the operation of the air conditioning system.

Then, in a step E13, the process compares the value calculated in step E12 to the value calculated in step E11.

In a step E14, the possible difference between these quantities is used to calculate set point values HC2 or HC16, which are then sent by the control device 3 to either the complementary electrical air heating device 2 or to the complementary electrical water heating device 16.

The flowchart of FIG. 5 clearly shows that, if the value of the overall required heating capacity HCglo is higher than the value of the optimal heating capacity of the heat loop HC1 obtained by cancellation of the derivative of the coefficient of performance COPglo, the additional heating capacity is provided by the complementary electrical heating device 2 or 16.

By contrast, if the overall heating capacity HCglo is below the heating capacity of the heat loop HC1 enabling the derivative of the coefficient COPglo to be cancelled, all of the heating will be performed with the heat loop that then has the best coefficient of performance.

Figure 6:
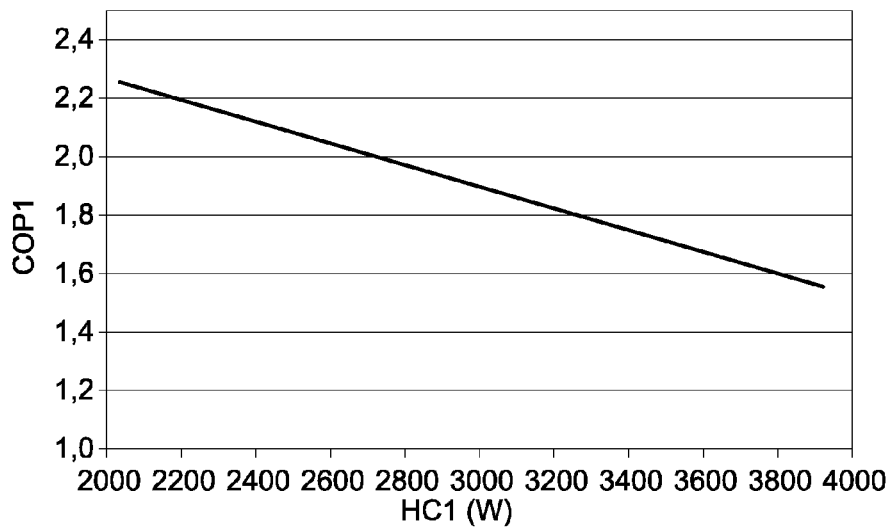
FIG. 6 provides an example of a variation in the coefficient of performance of a heat loop with respect to the heat capacity provided by the heat loop.

FIG. 6 shows an example of a variation in the coefficient of performance COP1 of a heat loop operating in heat pump mode as a function of the heating capacity HC1 for an external temperature of −10° C., a mass flow rate in the air conditioning system equal to 200 kg/h and an air speed over the heat exchanger equal to 1.7 m/s.

It is noted that this curve has a downward slope and that it can advantageously be approximated by a linear variation of which the equation is, in this case: Y=−0.00038 x+3.02607 with a coefficient of determination equal to 0.99403.

In this case, the heating capacity value of the heat loop can be calculated as follows:

$$HC1 = \frac{\sqrt{b} - b}{a} = \frac{\sqrt{3.026} - 3.026}{3.79 \cdot 10^{-4}} = 3391 \text{ W}$$

It is thus noted that, under the process conditions of this example, the optimal coefficient of performance for an overall heating capacity HCglo equal to 3550 watts will be achieved for the following distribution: heating capacity provided by the heat loop HC1=3391 watts and heating capacity provided by the complementary electrical heating device CH2=109 watts.

Figure 7:
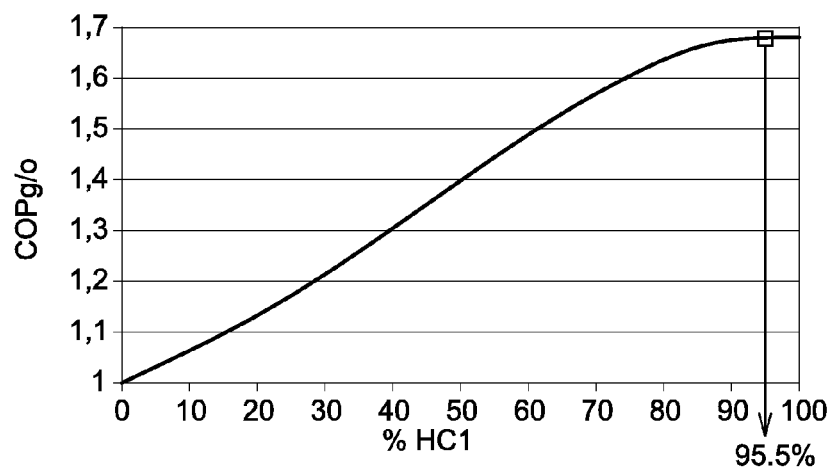
FIG. 7 shows an example of a change in the overall coefficient of performance of the air conditioning system for an overall capacity of 3550 watts as a function of the heating capacity percentage provided by the heat loop.

FIG. 7 shows, under the same conditions as FIG. 6, the overall coefficient of performance HCglo as a function of the proportion of the heating capacity provided by the heat loop % HC1.

It is noted that, for 95.5% of the overall heating capacity HCglo provided by the heat loop 1, the curve passes through a maximum.

It is noted that 95.5% of the required heating capacity HCglo, namely 3550 watts, is precisely equal to 3391 watts as already found above.

Figure 8:
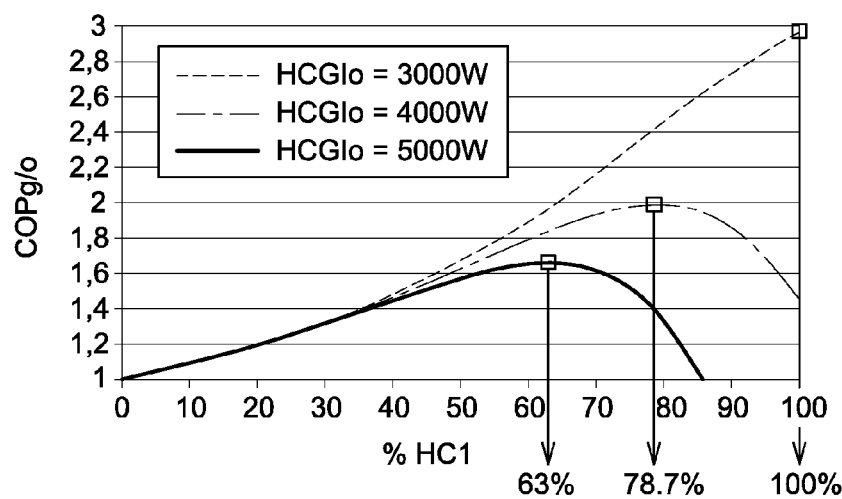
FIG. 8 shows examples of a change in the overall coefficient of performance as a function of the heating capacity percentage provided by the heat loop for three different overall heating capacities.

FIG. 8 shows three changes in the overall coefficient of performance COPglo for three different overall heating capacities HCglo: 3000, 4000 and 5000 watts. These curves are shown for an outside temperature of −10° C., an air flow rate DmA in the air conditioning system of 280 kg/h and an air speed VA over the external heat exchanger 10 of 1.7 m/second. These curves are shown as a function of the heating capacity percentage provided by the heat loop % HC1.

It is noted that, optimally, to provide an overall heating capacity of 3000 watts, it is more advantageous to provide the entire heating capacity to the heat loop 1. In this case, the complementary electrical heating device 2 will not be used. In addition, it is noted that the coefficient of performance obtained will be 3.

To provide an overall heating capacity of 4000 watts, it is noted that it is optimal to provide the eat loop 1 with 78.7% of the total required heating capacity HCglo, namely 3848 watts. In this case, the complementary electrical heating device will provide 852 watts. The coefficient of performance obtained will be 2, whereas, if the entire heating capacity HCglo were provided by the heat loop 1 of the air conditioning system, the coefficient of performance would be 1.46.

The control according to the invention of the operation of the complementary electrical heating device 2 has made it possible to increase the coefficient of performance by 37%.

Finally, to provide an overall heating capacity of 5000 watts, it is optimal to have 63% of the entire required heating capacity HCglo provided by the heat loop 1 of the air conditioning system, namely 3148 watts.

In this case, the complementary electrical device will provide 1850 watts. The coefficient of performance obtained will be 1.67.

It is finally noted that various implementations can be produced according to the principles of the invention.

The invention claimed is:

1. A process for control of an air conditioning system including a heat loop (1) operating according to a heat pump mode, in which the heat loop (1) includes at least one external heat exchanger (10), an internal heat exchanger (11) or a water-air exchanger radiator (15), a compressor (12), an expansion device (9) and an evaporator (13), in which the heat loop (1) provides a heating capacity (HC1) for the heat loop (1); the air conditioning system includes an electrical heating device (2, 16) providing a complementary heating capacity (HC2, HC16) and a control device (3) in which the process is implemented; the process includes the following steps:

receipt of a set point temperature,
determination of the air speed (VA) at the level of the external heat exchanger (10),
determination of the temperature of an air flow inside the air conditioning system (Tfa),
determination of the air flow rate (DmA) over the internal heat exchanger (11) or the water-air exchanger radiator (15),
calculation of an overall heating capacity (HCglo) on the basis of the temperature set point, the temperature of the air flow (Tfa) and the air flow rate over the internal heat exchanger (11),
determination of a heating capacity (HC1) of the heat loop (1), comparison of the heating capacity (HC1) of the heat loop (1) with the overall heating capacity (HCglo),
adjustment of the heating capacity (HC2, HC16) of the electrical heating device (2, 16) as a complement to the heating capacity (HC1) of the heat loop (HC1) if the heating capacity (HC1) of the heat loop (1) is lower than the overall heating capacity (HCglo),
wherein the heating capacity (HC1) of the heat loop (1) is limited to the heating capacity of the heat loop (1) cancelling the derivative with respect to this heating capacity (HC1) of the heat loop (1) of the overall coefficient of performance (COPglo) if this derivative is cancelled for a heating capacity (HC1) of the heat loop (1) below the overall capacity calculated (HCglo).

2. A process according to claim 1, which includes a preliminary step of estimating two coefficients a and b of a linear approximation of the coefficient of performance of the heat loop (COP1) as a function of the heating capacity (HC1) of the heat loop (1), in which these coefficients are each estimated as a function of the components of the heat loop (1), for at least a plurality of air speeds (VA) in the external heat exchanger (10), a plurality of temperatures of the air flow (Tfa) and a plurality of mass air flow rates (DmA) in the internal heat exchanger (11), in which the process then includes, after the measurement steps, a step of determining, among the coefficients estimated, coefficients of the approximation of the coefficient of performance of the heat loop (COP1) corresponding to the parameters measured, in which the heating capacity (HC1) of the heat loop (1) is limited to $(b^{1/2}-b)/a$.

3. A process according to claim 2, in which the air conditioning system includes an air-water heat loop and has a complementary electrical water heating device (16), in which coefficients a and b are also estimated as a function of the overall required heating capacity (HCglo).

4. A process according to claim 1, in which the air conditioning system is chosen from air conditioning systems including an air-air heat loop and equipped with an electrical air heating device (2), air conditioning systems including an air-water heat loop and equipped with an electrical air heating device (2), and air conditioning systems including an air-water heat loop and equipped with an electrical water heating device (16) with or without an electrical air heating device (2).

5. A process according to claim 1, which includes a preliminary step of estimating two coefficients a and b of a linear approximation of the coefficient of performance of the heat loop (COP1) as a function of the heating capacity (HC1) of the heat loop (1), in which these coefficients are each estimated as a function of the components of the heat loop (1), for at least a plurality of air speeds (VA) in the external heat exchanger (10), a plurality of temperatures of the air flow (Tfa) and a plurality of mass air flow rates (DmA) in the internal heat exchanger (11), in which the process then includes, after the measurement steps, a step of determining, among the coefficients estimated, coefficients of the approximation of the coefficient of performance of the heat loop (COP1) corresponding to the parameters measured, in which the heating capacity (HC1) of the heat loop (1) is limited to $(b^{1/2}-b)/a$.

6. A process according to claim 5, in which the air conditioning system includes an air-water heat loop and has a complementary electrical water heating device (16), in which coefficients a and b are also estimated as a function of the overall required heating capacity (HCglo).

7. A process according to claim 1, in which the air conditioning system is chosen from air conditioning systems including an air-air heat loop and equipped with an electrical air heating device (2), air conditioning systems including an air-water heat loop and equipped with an electrical air heating device (2), and air conditioning systems including an air-water heat loop and equipped with an electrical water heating device (16) with or without an electrical air heating device (2).

8. A process for control of an air conditioning system including a heat loop (1) operating according to a heat pump mode, in which the heat loop (1) includes at least one external heat exchanger (10), an internal heat exchanger (11) or a water-air exchanger radiator (15), a compressor (12), an expansion device (9) and an evaporator (13), in which the heat loop (1) provides a heating capacity (HC1) for the heat loop (1); the air conditioning system includes an electrical heating device (2, 16) providing a complementary heating capacity (HC2, HC16) and a control device (3) in which the process is implemented; the process includes the following steps:

receipt of a set point temperature, determination of the air speed (VA) at the level of the external heat exchanger (10), determination of the temperature of an air flow inside the air conditioning system (Tfa), determination of the air flow rate (DmA) over the internal heat exchanger (11) or the water-air exchanger radiator (15), calculation of an overall heating capacity (HCglo) on the basis of the temperature set point, the temperature of the air flow (Tfa) and the air flow rate over the internal heat exchanger (11), determination of a heating capacity (HC1) of the heat loop (1), comparison of the heating capacity (HC1) of the heat loop (1) with the overall heating capacity (HCglo), adjustment of the heating capacity (HC2, HC16) of the electrical heating device (2, 16) as a complement to the heating capacity (HC1) of the heat loop (HC1) if the heating capacity (HC1) of the heat loop (1) is lower than the overall heating capacity (HCglo), wherein a preliminary step of estimating two coefficients a and b of a linear approximation of the coefficient of performance of the heat loop (COP1) as a function of the heating capacity (HC1) of the heat loop (1), in which these coefficients are each estimated as a function of the components of the heat loop (1), for at least a plurality of air speeds (VA) in the external heat exchanger (10), a plurality of temperatures of the air flow (Tfa) and a plurality of mass air flow rates (DmA) in the internal heat exchanger (11), in which the process then includes, after the measurement steps, a step of determining, among the coefficients estimated, coefficients of the approximation of the coefficient of performance of the heat loop (COP1) corresponding to the parameters measured, in which the heating capacity (HC1) of the heat loop (1) is limited to $(b^{1/2}-b)/a$.

* * * * *